(12) United States Patent
Zamora

(10) Patent No.: US 6,729,721 B1
(45) Date of Patent: May 4, 2004

(54) SCRATCH PREVENTIVE EYEGLASSES

(76) Inventor: Ernest A. Zamora, 4000 - 38th St., Sacramento, CA (US) 95820

( * ) Notice: Subject to any disclaimer, the term of this patent is extended or adjusted under 35 U.S.C. 154(b) by 0 days.

(21) Appl. No.: 10/340,776

(22) Filed: Jan. 13, 2003

(51) Int. Cl.[7] ................................................ G02C 1/00
(52) U.S. Cl. ........................................ 351/41; 351/158
(58) Field of Search .................................. 351/41, 158

(56) References Cited

U.S. PATENT DOCUMENTS

| 2,668,952 | A | 2/1954 | Kobashikawa |
| 2,714,717 | A | 8/1955 | Allman |
| D226,282 | S | 2/1973 | Tagnon |
| 4,022,524 | A | 5/1977 | Florio |
| 4,217,037 | A | 8/1980 | Lemelson |
| 5,920,370 | A | 7/1999 | Ganzbergh |

FOREIGN PATENT DOCUMENTS

GB        2 115 173   *   9/1983   .................. 351/41

* cited by examiner

Primary Examiner—Huy Mai

(57) ABSTRACT

A scratch preventive eyeglasses for preventing accidental scratching of the lens members. The scratch preventive eyeglasses includes a frame including lens support members, and also including a bridge interconnecting the lens support member, and further including elongate temple members being attached to the lens support members and extending rearwardly thereof; and also includes lens members being securely disposed within the lens support members.

3 Claims, 2 Drawing Sheets

SCRATCH PREVENTIVE EYEGLASSES

BACKGROUND OF THE INVENTION

1. Field of the Invention

The present invention relates to eyeglasses and more particularly pertains to a new scratch preventive eyeglasses for preventing accidental scratching of the lens members.

2. Description of the Prior Art

The use of eyeglasses is known in the prior art. More specifically, eyeglasses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,022,524; U.S. Pat. No. 4,217,037; U.S. Pat. No. 2,714,717; U.S. Pat. No. 5,920,370; U.S. Pat. No. 2,668,952; and U.S. Pat. No. Des. 226,282.

While these devices fulfill their respective, particular objectives and requirements, the aforementioned patents do not disclose a new scratch preventive eyeglasses. The prior art includes eyeglasses having regular frames without any longitudinal extended portion also having lens.

SUMMARY OF THE INVENTION

The general purpose of the present invention, which will be described subsequently in greater detail, is to provide a new scratch preventive eyeglasses which has many of the advantages of the eyeglasses mentioned heretofore and many novel features that result in a new scratch preventive eyeglasses which is not anticipated, rendered obvious, suggested, or even implied by any of the prior art eyeglasses, either alone or in any combination thereof. The present invention includes a frame including lens support members, and also including a bridge interconnecting the lens support member, and further including elongate temple members being attached to the lens support members and extending rearwardly thereof; and also includes lens members being securely disposed within the lens support members. None of the prior art includes the combination of the elements of the present invention.

There has thus been outlined, rather broadly, the more important features of the scratch preventive eyeglasses in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new scratch preventive eyeglasses which has many of the advantages of the eyeglasses mentioned heretofore and many novel features that result in a new scratch preventive eyeglasses which is not anticipated, rendered obvious, suggested, or even implied by any of the prior art eyeglasses, either alone or in any combination thereof.

Still another object of the present invention is to provide a new scratch preventive eyeglasses for preventing accidental scratching of the lens members.

Still yet another object of the present invention is to provide a new scratch preventive eyeglasses that is easy and convenient to use.

Even still another object of the present invention is to provide a new scratch preventive eyeglasses that provides a protective barrier which extends forwardly of the lens members thus preventing the user or someone else from being able to accidentally touch the lens members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
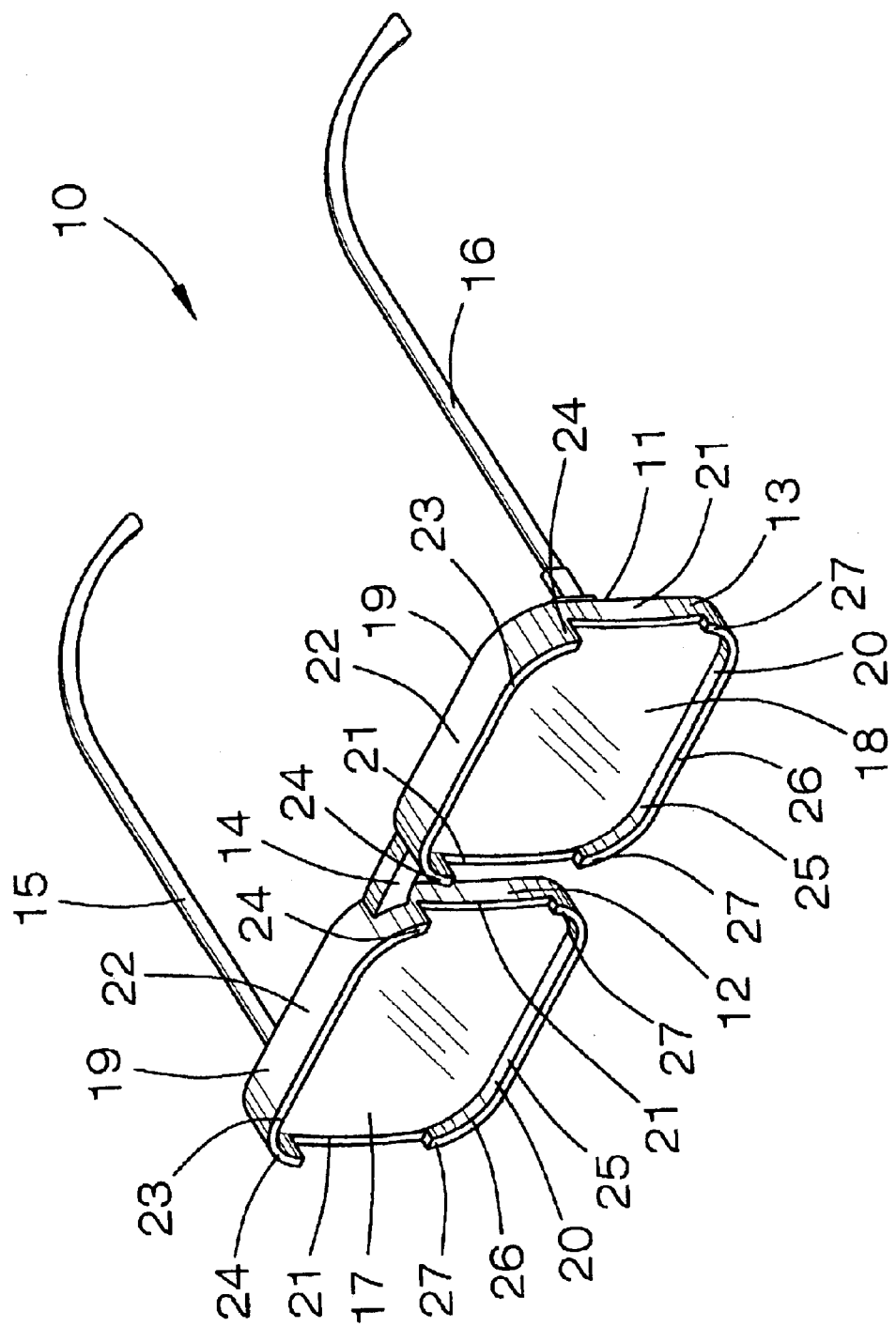
FIG. 1 is a perspective view of a new scratch preventive eyeglasses according to the present invention.
Figure 2:
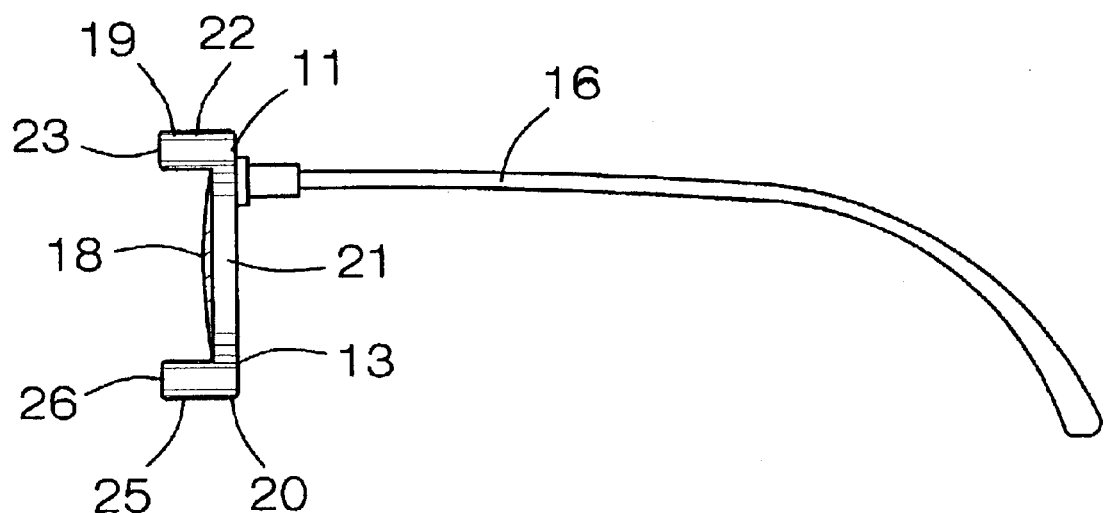
FIG. 2 is a side elevational view of the present invention.
Figure 3:
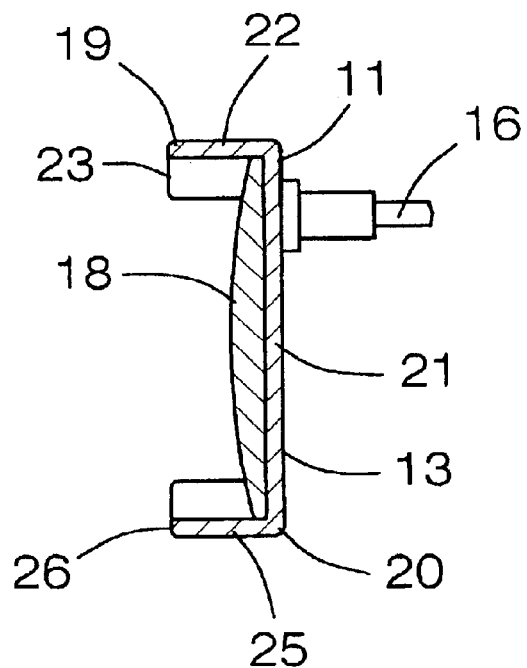
FIG. 3 is a partial cross-sectional view of the present invention.

With reference now to the drawings, and in particular to FIGS. 1 through 3 thereof, a new scratch preventive eyeglasses embodying the principles and concepts of the present invention and generally designated by the reference numeral 10 will be described.

As best illustrated in FIGS. 1 through 3, the scratch preventive eyeglasses 10 generally comprises a frame 11 including lens support members 12,13, and also including a bridge 14 conventionally interconnecting the lens support member 12,13, and further including elongate temple members 15,16 being conventionally attached to the lens support members 12,13 and extending rearwardly thereof.

Lens members 17,18 are securely and conventionally disposed within the lens support members 12,13. The lens support members 12,13 are generally rings each having an elongate top portion 19 being conventionally disposed along a top edge of a respective lens member 17,18, and also having an elongate bottom portion 20 being conventionally disposed along a bottom edge of a respective lens member 17,18, and further having elongate side portions 21 being conventionally disposed along side edges of a respective lens member 17,18. Each of the elongate top portions 19 has a main portion 22 to which the elongate temple members 15,16 are conventionally attached and to which respective elongate side members 21 are conventionally attached, and also has a longitudinal outer portion 23 being integrally connected to the main portion 22 and extending outwardly forward of a respective lens member 17,18 and forward of respective elongate side portions 21. Each of the elongate bottom portions 20 has a main portion 25 to which respective elongate side portions 21 are conventionally attached, and also has a longitudinal outer portion 26 being integrally connected to the main portion 25 and extending outwardly forward of a respective lens member 17,18 and forward of respective elongate side portions 21 to prevent accidental contact to the lens members 17,18 thus resulting in the scratching thereof. The longitudinal outer portions 23,26 of the elongate top portions 19 and the elongate lower portions 20 have curved ends 24,27 so that there are no sharp edges upon which a user can cut oneself while using the scratch preventive eyeglasses 10.

In use, the user would put on the scratch preventive eyeglasses 10 just like any other pair of eyeglasses except the longitudinal outer portions 23,26 of the lens support members 12,13 prevent any accidental contact to the lens members 17,18, since the longitudinal outer portions 23,26 extend forward of the lens members 17,18 are the only parts of the frame 11 and lens members 17,18 that comes into contact with another object such as the floor should the user drop the scratch preventive eyeglasses 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the scratch preventive eyeglasses. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A scratch preventive eyeglasses comprising:

a frame including lens support members, and also including a bridge interconnecting said lens support member, and further including elongate temple members being attached to said lens support members and extending rearwardly thereof, said lens support members being generally rings each having an elongate top portion being disposed along a top edge of a respective said lens member, and also having an elongate bottom portion being disposed along a bottom edge of a respective said lens member, and further having elongate side portions being disposed along side edges of a respective said lens member, each of said elongate top portions has having a main portion to which said elongate temple members are attached and to which respective said elongate side members are attached, and also has having a longitudinal outer portion being integrally connected to said main portion and extending outwardly forward of a respective said lens member and forward of respective said elongate side portions; and lens members being securely disposed within said lens support members.

2. The scratch preventive eyeglasses as described in claim 1, wherein each of said elongate bottom portions has a main portion to which respective said elongate side portions are attached, and also has a longitudinal outer portion being integrally connected to said main portion and extending outwardly forward of a respective said lens member and forward of respective said elongate side portions to prevent accidental contact to said lens members thus resulting in the scratching thereof.

3. The scratch preventive eyeglasses as described in claim 2, wherein said longitudinal outer portions of said elongate top portions and said elongate bottom portions have curved ends so that there are no sharp edges upon which a user can cut oneself while using said scratch preventive eyeglasses.

\* \* \* \* \*